EPITAXIAL DEPOSITION REACTOR

Original Filed Nov. 13, 1962 2 Sheets-Sheet 1

George E. Hissong, Jr.
Warren Rice
INVENTORS
BY Robert C. Peterson
Attorney

George E. Hissong, Jr.
Warren Rice
INVENTORS
BY Robert C. Peterson
Attorney

United States Patent Office 3,621,812
Patented Nov. 23, 1971

3,621,812

EPITAXIAL DEPOSITION REACTOR

George E. Hissong, Jr., Dallas, Tex., and Warren Rice, Tempe, Ariz., assignors to Texas Instruments Incorporated, Dallas, Tex.

Continuation of application Ser. No. 649,427, June 23, 1967, which is a continuation of application Ser. No. 237,161, Nov. 13, 1962. This application June 18, 1969, Ser. No. 838,017
Int. Cl. C23c *11/00*
U.S. Cl. 118—48 3 Claims

ABSTRACT OF THE DISCLOSURE

An epitaxial deposition reactor having a conically divergent, reactant gas outlet which closely overlays and circumscribes a substrate which is supported on a graphite, resistance heater. Means sheath the reaction zone with an inert gaseous atmosphere.

This application is a continuation of application Ser. No. 649,427 filed June 23, 1967, now abandoned, which was a continuation of application Ser. No. 237,161 filed Nov. 13, 1962, now abandoned.

This invention relates to an epitaxial apparatus for semiconductors and more particularly to an epitaxial apparatus for semiconductors wherein a semiconductor substrate is extended by epitaxial growth associated with decomposition of reactant gases directed toward a substrate and impinging thereagainst in a substantially perpendicular flow pattern.

In the invention, the apparatus appertaining thereto affords exact control necessary and appropriate to the maintenance of high purity reactants approaching the substrate to be epitaxially extended. Moreover, the apparatus appertaining to the invention cooperatively interrelates appropriate parts to achieve a closely controlled reactant approach pattern to the substrate being epitaxially extended, the flow approach pattern being substantially perpendicular to the substrate with a velocity in the laminar flow region as opposed to the turbulent flow region.

Briefly, the apparatus in accordance with the invention provides for the manufacture of epitaxially extended single crystal semiconductor substrates of closely controlled resistivity and thickness of the epitaxially deposited layers. Such control is afforded in the apparatus of the invention inasmuch as the reactants are supplied at a uniform concentration against a uniformly heated semiconductor substrate through a flow approach pattern maintained at a controlled laminar flow rate and substantially perpendicular to the surface of the substrate being epitaxially extended.

It is therefore an object of the invention to provide an apparatus for epitaxially extending the thickness of a semiconductor substrate by flowing a gaseous reactant stream with a flow approach pattern in the laminar flow region substantially perpendicularly against a substrate being heated to a temperature sufficient to promote epitaxial growth thereof;

Another object of the invention is to provide suitable apparatus for producing a process stream of reactants for epitaxial deposition of semiconductor material onto a substrate at a uniform flow rate and concentration in a flow approach pattern that is substantially perpendicular to the substrate;

It is still another object of the invention to provide apparatus which affords a flow stream of high purity gaseous material directed in a substantially perpendicularly flow pattern against the substrate to be epitaxially extended, the substrate being maintained at an elevated temperature within a reactor;

A further object of the invention is to provide apparatus suitably constructed and arranged to maintain a flow approach pattern of gaseous reactants directed against a substrate being epitaxially extended substantially perpendicular with respect to said substrate insofar as necessary to provide a uniform epitaxial growth rate and uniform resistivity of the epitaxially deposited layer;

Still a further object of the invention is to provide apparatus having a gas flow control element arranged in a reactor near the surface of a heated substrate to be epitaxially extended which provides the gas stream with a flow approach pattern containing uniform reactant distribution therethrough and directs the gas stream substantially perpendicularly toward the substrate;

Another object of the invention is to provide an apparatus to epitaxially extend the thickness of a semiconductor substrate in such a manner as to produce a uniform layer of controlled resistivity by impinging a uniform flow of gaseous reactants against said substrate with a flow approach pattern substantially perpendicular with respect to said substrate;

Another further object of the invention is to provide an apparatus to extend epitaxially the thickness of a semiconductor substrate wherein a flow of uniform gaseous reactance is directed toward the semiconductor substrate in a flow approach pattern substantially perpendicular with respect to said substrate, the substrate being placed within a reaction chamber and heated to a temperature sufficient for epitaxial growth.

These and other objects and advantages of the invention will become readily apparent when taken in conjunction with the appended claims and the drawings wherein FIG. 1 illustrates the control system utilized for furnishing appropriate reactants and other materials to the reactor;

Figures 1, 2:
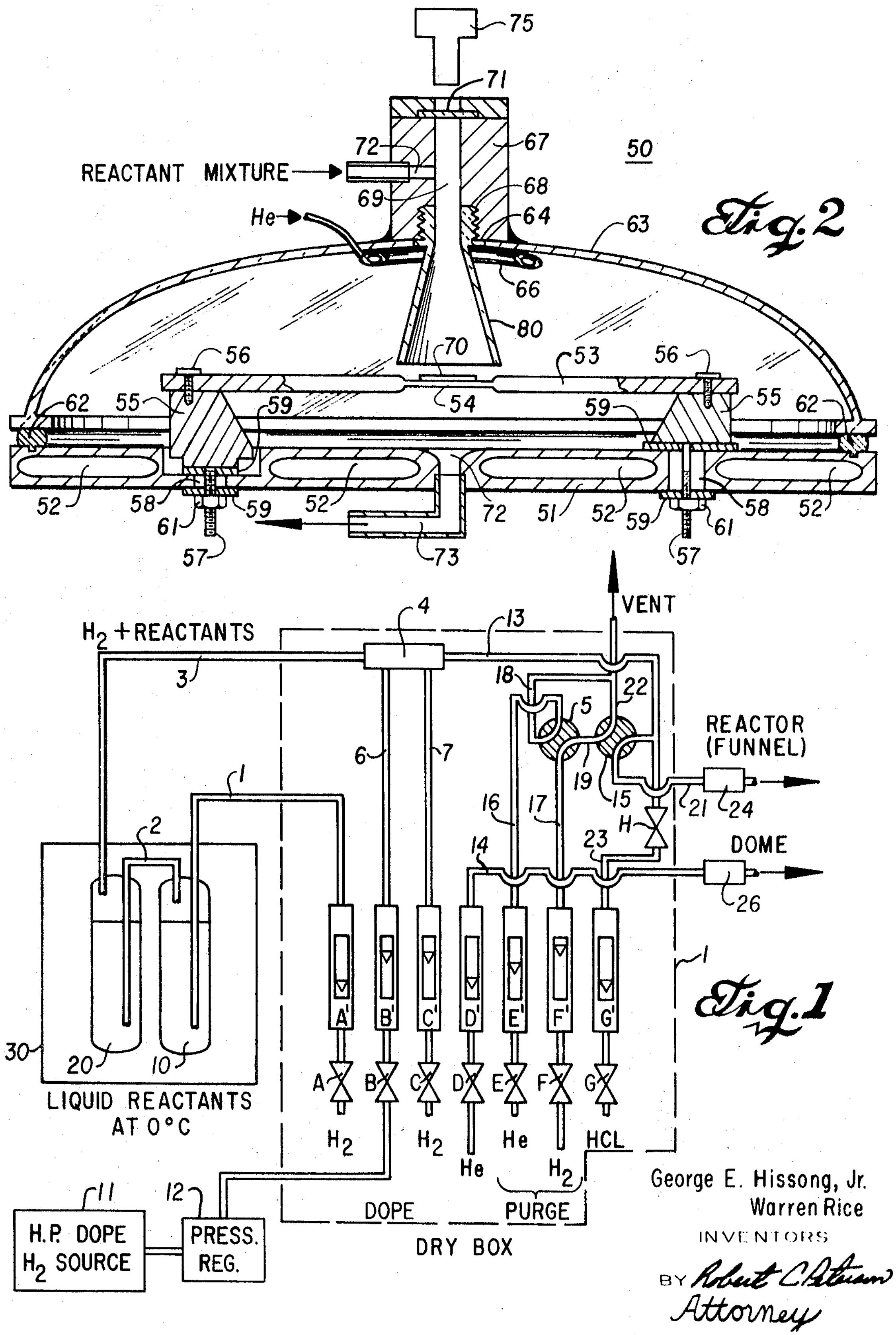
FIG. 2 illustrates the reactor which is utilized to epitaxially extend a semiconductor substrate.

Referring specifically to FIG. 1, a detailed description of the flow system control will now be presented. The control system consists of a series of valves, A through G, and their associated flow meters A′ through G′ which provide close control of the gases furnished to the reactor funnel and dome. Control valve A and flow meter A′ interpose line 1 which furnishes purified hydrogen into liquid reactant holders 10 and 20. The hydrogen is first bubbled through liquid reactant holder or container 10 entraining some of the liquid reactant or semiconductor compound and then passes through pipe or line 2 into liquid reactant container 20 wherein more of the liquid reactant or semiconductor material is entrained in the gas stream. The liquid reactant or semiconductor material is maintained at a constant temperature preferably at 0° C. so that the vapor pressure will remain constant and permit the hydrogen to entrain a precise quantity at a given flow rate. The hydrogen with entrained liquid reactant or semiconductor material therein is passed out of the container 20 through pipe 3 into a mixing chamber 4. High pressure dope and hydrogen source 11 furnish dope diluted with hydrogen at a lower pressure via pressure regulator 12 through control valve B and its associated flow meter B′ by way of pipe or line 6 to the mixing chamber 4. Purified hydrogen which provides further control over the flow rate of reactance dope and hydrogen is introduced in the mixing chamber 4 via pipe or line 7 at a rate controlled by valve C and its associated flow meter C′. The hydrogen from the liquid reactant container entrained therein and the dope are passed from mixing chamber 4 via pipe 13 to four-way valve 15.

Pipe or line 14 interposed by flow valve D and its associated flow meter D′ provides helium or other similar inert gas to the reactor dome through pipe 14 and coupler 26 to the input of ring 66. Pipe 16 having interposing control valve E with its associated flow meter E′ provides helium to four-way valve 5. Line or pipe 17 interposed by control valve F and its associated flow meter F′ provides purified hydrogen to four-way valve 5. Pipe 18 couples four-way valve 5 to an atmospheric vent and pipe 19 couples four-way valve 5 to four-way valve 15. The four-way valve 5 in one position couples pipe 16 to pipe 18 to discharge helium out of the vent and in the other position ports hydrogen to pipe 18 leading out of the vent. Four-way valve 15 has an output line or pipe 21 which via coupler 24 is attached to the reactor funnel input and a pipe 22 which is coupled to the vent. The four-way valve 15 may be set to provide a purge of helium or hydrogen from the four-way valve 5 via pipe 21 to the reactor or via pipe 22 to the vent. Likewise, four-way valve 15 may send the reactants in pipe 13 to the reactor via pipe 21 or vent the reactants to the atmosphere.

Inasmuch as it is often desirable particularly in the epitaxial growth of germanium to provide an etch gas to the reactor, a hydrogen chloride dry gas source is provided to furnish hydrogen chloride via pipe 23 interposed by a control valve G and its associated flow meter G′ to an off-on valve H which is coupled to pipe 13, concurrently providing hydrogen chloride gas along with the semiconductor reactants to the reactor funnel via four-way valve 15 and pipe 21.

The entire control system is maintained within a dry box with a positive pressure with respect to the atmosphere to prevent or at least reduce leakage of the ambient into the control system to back diffusion into the dry box. Seals are provided for all piping entering and leaving the dry box. Pipes 1, 2, 3, 6, 7, 13, 14, 17 and 23 are glass. Mixing chamber 4 is also glass and pipes 18 and 22 are copper. Pipe 19 is Teflon and pipe 21 is Teflon. Liquid reactant containers 10 and 20 are made of stainless steel, preferably type 316. The temperature is maintained by ice box 30 or any desired refrigeration system in lieu thereof. The hydrogen utilized in the process may be purified in any suitable manner, however, the process described in either U.S. Pat. No. 2,911,057 or 2,773,561 is preferable.

Referring specifically to FIG. 2, there is illustrated the epitaxial reactor generally designated 50. The reactor consists of a base plate 51 having fluid circulating ducts 52 suitable for providing cooling thereof. A pair of posts 55 which may be graphite or stainless steel are mounted on base plate 51 by studs 57 extending through holes 58 and secured by nuts 61. The posts 55 are insulated from base plate 51 by mica washers 59. A high purity graphite strip 53 having a reduced center region 54 is attached to graphite or stainless steel posts 55 by a pair of screws 56.

A source of AC power (not shown) is attached across studs 57 to supply power for resistively heating the graphite strip 53. A semiconductor substrate 70, a substantially planar or flat wafer having a pair of major faces, to be epitaxially extended is positioned in the reduced area 54 of graphite strip 53. Sealed against the periphery of plate 51 by O ring 62 is dome 63, retained thereagainst by any suitable clamping arrangement. At the apex of dome 63 a hole 64 is provided. Concentric with the hole and attached to the inner surface of the dome is a hollow ring 66 which is coupled to the helium pipe 14. The ring 66 has a series of perforations which direct helium flow inwardly at an angle of 45° from vertical. A block 67 having a threaded bore 68 communicating with a reduced bore 69 is welded to the dome 63. At the upper end of block 67, a window 71 seals bore 69 and provides an optical line of sight to the substrate 70 so that the temperature of substrate 70 may be optically determined by a suitable optical sensor 75. Stainless steel block 67 has a port 72 communicating with bore 69. A threaded funnel 80 which has an angular flare of 15° from the vertical is mounted in threaded bore 68 of block 67. An exhaust port 72 is provided in base plate 51 with a lead-off pipe 73 attached thereto.

Figure 3:
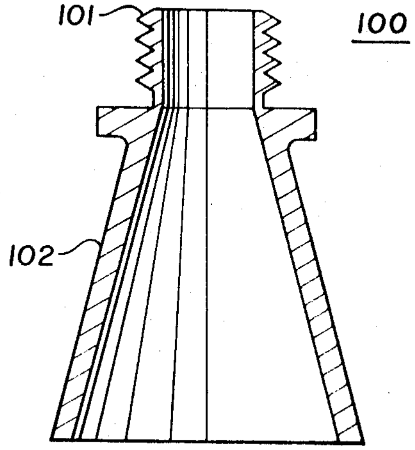
FIG. 3 illustrates the preferred funnel of the reactor.

Referring now to FIG. 3, a description of the preferred embodiment of the funnel will be noted. The funnel is generally designated by the reference numeral 100. The funnel bore 101 has an inside diameter of 0.386 in. and is 0.437 in. deep. Flaring outward from bore 101 is the funnel cone 102 which has a wall thickness of 0.070 in. The sides of cone 102 form a 15° angle (see FIG. 3 angle $\alpha$) with the vertical. The diameter of cone 102 at the mouth thereof is 1.390 in. The over-all height of the funnel 100 is 2.035 in. The entire funnel is made of graphite. The funnel just described is positioned as seen in FIG. 2 about 100–150 mils above the substrate being extended.

Figure 4:
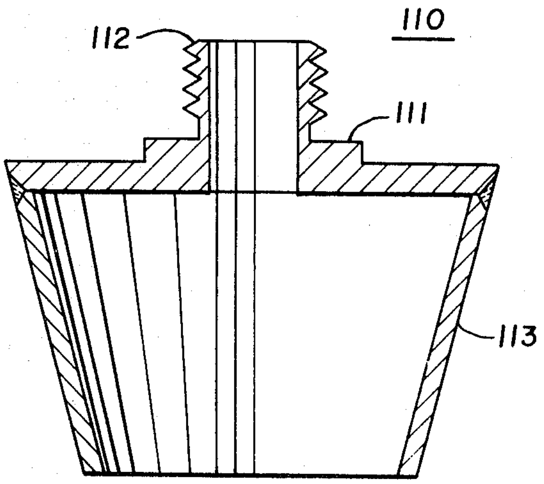
FIG. 4 illustrates another shape for the reactor funnel.

FIG. 4 illustrates another funnel configuration which may be used in the process. The funnel generally designated 110 comprises a circular plate 111 having a through bore 112. The side wall 113 of the funnel is conical and extends inwardly at a 15° angle from vertical. The funnel mouth opening is 1.390 in. diameter. The diameter of bore 112 is .386 in. and the over-all height of the funnel is 2.035 in. The funnel 110 is made of type 316 stainless steel.

Figure 5:
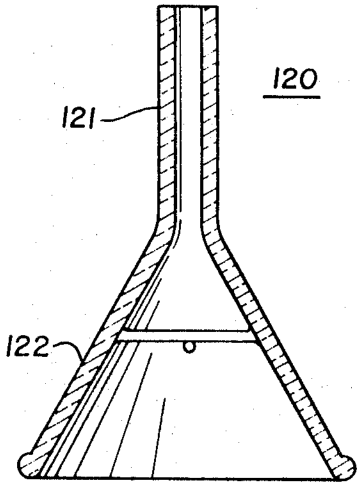
FIG. 5 illustrates the funnel design having a cross-shape separator.

FIG. 5 illustrates yet another funnel configuration which may be used. The funnel generally designated by the number 120 comprises a stem portion 121 and a conical region 122 which flares at a 30° angle from vertical. The stem portion 121 has an internal diameter of .150 in. The mouth of conical region 122 is 1.545 in. diameter. Conical region 122 extends for 1.20 in. A distance 0.60 in. from the mouth of conical section 122 a cross of 0.040 in. diameter rod is provided. The entire funnel is made of Pyrex glass.

It should be appreciated that many configurations of funnel design will occur to those skilled in the art and that the particular funnel shapes are not critical in achieving the objects and advantages of the invention.

In general, the epitaxial process conducted in the apparatus hereinbefore described is performed as hereinafter set forth. Throughout the application, flow rates are set out in moles per minute and in all cases the flow rate is at standard conditions of temperature and pressure.

If the semiconductor material to be processed is germanium, the control system is set up to provide the following. The control valve A is adjusted to provide a hydrogen flow into reactant containers 10 and 20 at a rate of .001 to .10 mol/minute into the mixing chamber 4. The dope, which may be either phosphine ($PH_3$) for N-type or diborane ($B_2H_6$) for P-type is provided into mixing chamber 4 by setting control valve B for a flow rate of 0.00002 to 0.007 mol/minute. In this manner the ratio of reactants to dope may be established at any desired value. Control valve C is adjusted to provide a flow rate of hydrogen into the mixing chamber 4 so that an over-all flow rate of about 0.06 mol/minute may be furnished into the reactor funnel. Control valve D is set at the desired flow meter D′ reading to provide helium to the dome at a rate of 0.125 mol/minute. Control valve E is adjusted to provide a flow rate of helium to four-way valve 5 at the desired rate of .031 mol/minute to purge the funnel 80 of the reactor 50. Control valve F is adjusted to provide a hydrogen flow to four-way valve 5 at the desired rate of 0.06 mol/minute. The hydrogen chloride output valve H is opened and the hydrogen chloride gas flow rate is established by adjusting control valve G until flow meter G′ indicates the desired hydrogen chloride flow rate of about 0.007 mol/minute.

The reactor funnel 80 and dome 63 are purged with helium for several minutes and then power is applied to the heater strip 53 and the substrate 70 is allowed to come up to the desired temperature between 850° and 900° C. After the substrate has reached reaction temperature the four-way valves 5 and 15 are set to introduce the reaction mixture from mixing chamber 4 and the hydrogen chloride gas into the reactor funnel. The hydrogen chloride flow is cut off after about one minute and the growth begins on the germanium substrate. By adjusting the controls to various positions the growth rate may be established preferably between .1 mil to .25 mil/minute. After the desired period of deposition has passed, the heater is shut off and the four-way valves 5 and 15 are switched to provide helium purge of the funnel until the temperature has decreased sufficiently for removal of the germanium.

If silicon is the semiconductor to be used, the liquid reactants are compounds of silicon such as trichlorosilane or silicon-tetrachloride, the dopes may remain the same. The phosphine or arsine is used if N-type silicon is desired and diborane or boron-tribromide is used if P-type silicon is desired. In the silicon process the valve H is closed and flow control valve G is shut off to prevent HCl from entering in the reaction. A slice of silicon from .8 to 1.1 inches in diameter having a resistivity of .009 to .020 cm. is positioned in the reactor on the heater strip 53 as substrate 70. The dome is replaced and the system is purged with helium for several minutes. After the helium purge, the heater is activated and four-way valves 5 and 15 are manipulated to provide pure hydrogen in the funnel. Hydrogen is provided in the funnel for about two minutes after heating to the operating temperature of from about 1160° C. to 1200° C. The four-way valves 5 and 15 are then manipulated to provide the reaction mixture from chamber 4 into the funnel 80. The total flow rate as established through the funnel is sufficient to provide a growth rate from a minute amount of growth up to 0.25 mil/minute, preferably the growth rate being 0.2 mil/minute. After the desired thickness has been achieved, the four-way valves 5 and 15 are again manipulated to provide pure hydrogen gas into the funnel after cutting off the heaters to reduce the temperature. Pure hydrogen gas is flowed into the funnel until the temperature is about 100° C. after which the four-way valves are manipulated to provide helium into the funnel.

Having outlined the general operating procedure for epitaxially depositing or extending semiconductor substrates, Tables I and II appearing hereinafter set forth specific examples of epitaxially extending germanium and silicon substrates, respectively.

In Table I the germanium substrates were P-type, .002–.004 ohm-cm. resistivity. All substrates were extended under conditions of 0.125 mol/minute He flow to the reactor dome, of 0.031 mol/minute He flow to urge the funnel, and of .007 mol/minute HCl flow to etch the substrate. The dope was 50 p.p.m. $B_2H_6$ in hydrogen, and $H_2$ flow into mixing chamber was 0.06 mol/minute. In the examples of Table I, the substrate temperature was 850°

C. In all examples the epitaxially extended substrates were used to make acceptable semiconductor devices.

TABLE I.—GERMANIUM SUBSTRATES

| Substrate No. | $H_2$ flow into liq. react., mol/min. | Dope flow rate, mol/min. | React. mix funnel flow, mol/min. | Run time, min. | Epitaxial layer: Thickness, mil | Epitaxial layer: Resistivity, r-cm. |
|---|---|---|---|---|---|---|
| 1 | .011 | .004 | .075 | 2.0 | .250 | 0.070 |
| 2 | .011 | .0035 | .074 | 2.0 | .250 | 0.080 |
| 3 | .011 | .0006 | .0716 | 2.0 | .250 | 0.24 |
| 4 | .011 | .00044 | .0714 | 2.0 | .250 | 0.26 |
| 5 | .011 | .00022 | .0712 | 2.0 | .250 | 0.50 |
| 6 | .011 | .00009 | .0711 | 2.0 | .250 | 1.20 |
| 7 | .011 | .00006 | .07106 | 2.0 | .250 | 1.30 |
| 8 | .011 | .00003 | .071 | 2.0 | .250 | 2.25 |
| 9 | .011 | .00002 | .071 | 2.0 | .250 | 3.00 |
| 10 | .005 | .0007 | .0657 | 3.0 | .100 | 0.16 |
| 11 | .007 | .0002 | .0672 | 2.0 | .100 | 1.60 |
| 12 | .007 | .0001 | .0671 | 2.0 | .100 | 2.00 |
| 13 | .009 | .004 | .073 | 2.0 | .150 | 0.16 |
| 14 | .009 | .002 | .071 | 2.0 | .150 | 0.20 |
| 15 | .009 | .0017 | .0706 | 2.0 | .150 | 0.22 |
| 16 | .009 | .0003 | .0693 | 2.0 | .150 | 1.25 |
| 17 | .014 | .005 | .0745 | 2.0 | .155 | 0.80 |
| 18 | .018 | .007 | .0787 | 2.0 | .300 | 0.090 |
| 19 | .018 | .005 | .0785 | 2.0 | .300 | 0.13 |

The silicon substrates listed in Table II epitaxially extended in accordance with the invention utilized a 0.07 mol/minute He flow in the reactor dome, and a 0.09 mol/minute $H_2$ flow into the liquid reactant bottles. The flow rate of hydrogen diluent into the mixing chamber was 0.06 mol/minute. During the funnel purge period the He purge flow was 0.018 mol/minute and the $H_2$ purge flow was 0.06 mol/minute. In all examples the substrate was heated to a reaction temperature of 1230° C.

TABLE II.—SILICON SUBSTRATES

| Substrate No. | Substrate[1] resistivity, r-cm. | Dope: Type | Dope: Flow rate, mol/min. | React. mix funnel flow, mol/min. | Run time, min. | Epitaxial layer: Thickness, mils | Epitaxial layer: Resistivity, r-cm. |
|---|---|---|---|---|---|---|---|
| 1 | .009–.020 (N-type) | $PH_3$ | .002 | .152 | 1.67 | .310 | 0.50 |
| 2 | do | $PH_3$ | .0007 | .151 | 2.92 | .55 | 1.8 |
| 3 | do | $PH_3$ | .002 | .152 | 1.67 | .31 | 0.65 |
| 4 | do | $PH_3$ | .0001 | .150 | 3.0 | .58 | 4.0 |
| 5 | 8–15 (N-type) | $B_2H_6$ | .00007 | .150 | 7.0 | 1.30 | 8.0 |
| 6 | .004–.006 (P-type) | $B_2H_6$ | .001 | .151 | 2.75 | .450 | 2.0 |

[1] Conductivity type noted in parenthesis.

It should be appreciated that various modifications and changes may be made in the apparatus of the invention without departing from the scope and spirit of the invention which is limited only by the scope of the appended claims.

What is claimed is:

1. An epitaxial deposition reactor comprising in combination:

(a) a substantially planar support base having conduits therewithin to provide for the circulation of a cooling medium;

(b) a cover member releasably secured to said base for providing a closed chamber and having a window portion for viewing a substrate disposed in said chamber;

(c) a substantially planar, high purity graphite holder for holding said substrate at a centrally disposed, relatively thin portion of said holder and said holder being supported by said base in closely spaced relationship thereto but electrically isolated therefrom;

(d) at least one substrate held in position within said chamber by said holder;

(e) an intake port for selectively inserting a reactant mixture into said chamber;

(f) an exhaust port for selectively removing said reactant mixture from said chamber;

(g) electrical conductor means passing through insulated portions of said base and connected to said graphite holder for resistively heating said holder and for conductively heating said substrate;

(h) funnel means for directing said reactant mixture from said intake port to said heated substrate, and for causing said reactant mixture to impinge upon one surface of said substrate at a substantially 90° angle;

(i) said funnel means comprising a divergent, conical outlet which closely overlays and circumscribes said substrate; and (j) circumscribing means sheathing the reaction zone with an inert gaseous atmosphere comprising a hollow ring shaped conduit disposed at substantially the apex of said conical outlet and having a plurality of dispensing apertures.

2. The epitaxial deposition reactor of claim 1 wherein said funnel-shaped member has an approximately 15° diverging conical region.

3. The epitaxial deposition reactor of claim 1 wherein said funnel-shaped member has an approximately 30° diverging conical region, and includes a cross member positioned within said conical region transverse to the longitudinal axis of said funnel.

References Cited

UNITED STATES PATENTS

| | | | |
|---|---|---|---|
| 2,831,784 | 4/1958 | Gastinger | 117—201 |
| 2,887,407 | 5/1959 | Koch | 117—107 |
| 3,011,877 | 12/1961 | Schweickert et al. | 117—106 A |
| 3,078,150 | 2/1963 | Raymond | 23—223.5 |
| 3,099,579 | 7/1963 | Spitzer et al. | 117—106 A |
| 3,139,361 | 6/1964 | Rasmanis | 148—175 |
| 3,168,422 | 2/1965 | Allegretti et al. | 156—170 X |
| 3,211,583 | 10/1965 | Riley | 117—106 A |
| 3,243,323 | 3/1966 | Corrigan et al. | 117—106 A |

MORRIS KAPLAN, Primary Examiner

U.S. Cl. X.R.

219—275